(No Model.)  2 Sheets—Sheet 1.

A. J. HELVERN & W. B. SCHWALM.
DRIVING MECHANISM FOR PLANTERS.

No. 459,289.  Patented Sept. 8, 1891.

WITNESSES:
Chas Niela
C. Sedgwick

INVENTORS.
A. J. Helvern
W. B. Schwalm
BY Munn & Co.
ATTORNEYS (No Model.) 2 Sheets—Sheet 2.
A. J. HELVERN & W. B. SCHWALM.
DRIVING MECHANISM FOR PLANTERS.
No. 459,289. Patented Sept. 8, 1891.
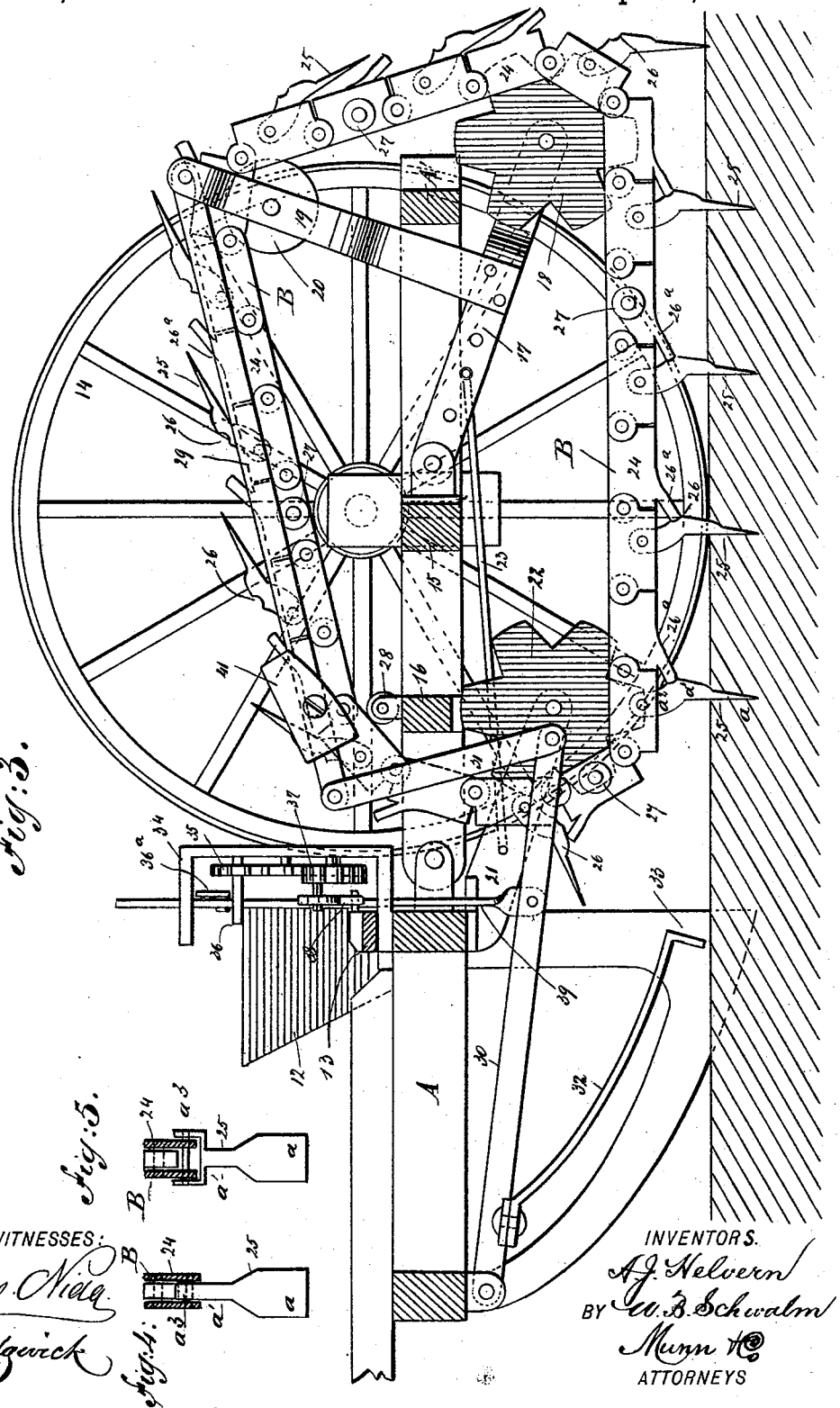
WITNESSES:
Chas Nida
C. Sedgwick
INVENTORS
A. J. Helvern
W. B. Schwalm
BY Munn & Co.
ATTORNEYS
THE NORRIS PETERS CO., PHOTO-LITHO., WASHINGTON, D. C.

UNITED STATES PATENT OFFICE.

ALBERT J. HELVERN AND WILLIAM B. SCHWALM, OF WALTON, INDIANA.

DRIVING MECHANISM FOR PLANTERS.

SPECIFICATION forming part of Letters Patent No. 459,289, dated September 8, 1891.

Application filed December 16, 1890. Serial No. 374,865. (No model.)

*To all whom it may concern:*

Be it known that we, ALBERT J. HELVERN and WILLIAM B. SCHWALM, of Walton, in the county of Cass and State of Indiana, have invented a new and Improved Driving Mechanism for Planters, of which the following is a full, clear, and exact description.

Our invention relates to the driving mechanism for the seed-drop bars of planters, and has for its object to improve the construction of such mechanism shown and described in the application for Letters Patent filed by us August 27, 1890, Serial No. 363,196, and patented December 23, 1890, No. 443,443.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1:
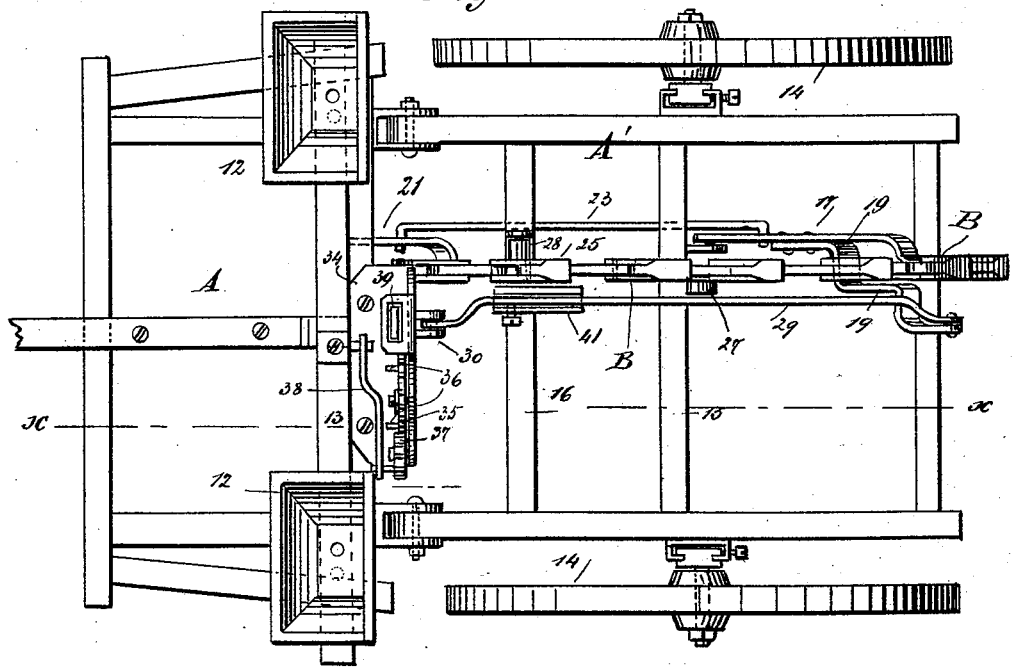
Figure 2:
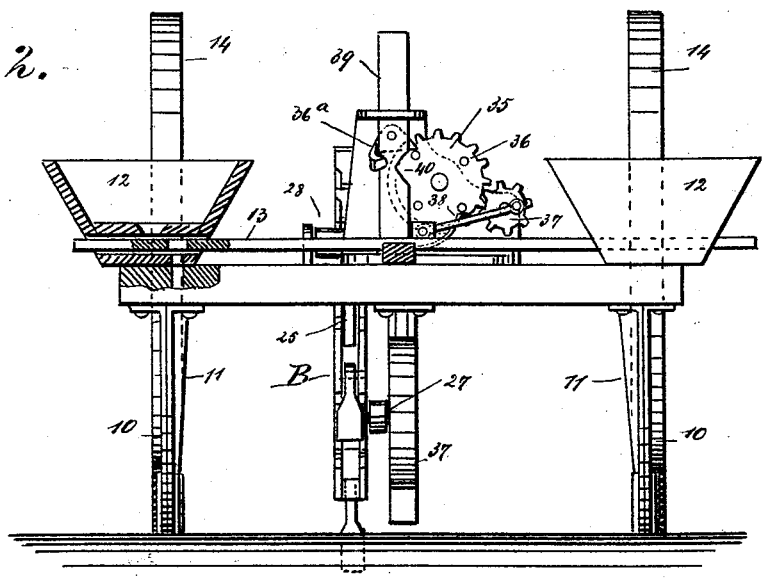

Figure 1 is a plan view of an implement having the device applied thereto. Fig. 2 is a front elevation of the implement, the seed-box, frame, and drop-slide being partially broken away at one end. Fig. 3 is a longitudinal section on the line $x\,x$ of Fig. 1. Fig. 4 is a transverse section through the driving-chain, illustrating the manner of pivoting the fingers therein; and Fig. 5 is a similar view illustrating a modification in the pivoting of the fingers.

The frame of the implement is illustrated as constructed in two parallel rectangular sections A and A', the section A' being the rear section and hinged to the forward section. The forward section has attached thereto the usual runners 10, and at the rear of the runners the seed spouts or chutes 11 are located, which spouts have connection with seed-boxes 12, of any approved construction, the said boxes being located upon the forward frame-section, and one drop-slide 13 has movement in both boxes, as is best shown in Fig. 2. The rear section A' is supported by wheels 14, which wheels are attached to the section in such manner that the said section may be raised or lowered relatively to the wheels. The rear section, which is the hinge-section, is provided with two or more, preferably two, intermediate cross-bars 15 and 16, and to the intermediate cross-bar 15 one end of a downwardly-extending arm 17 is pivoted, the lower end of which arm is slightly curved inward, and to the curved portion of the arm a sprocket or chain wheel 18 is pivotally attached. An upwardly-curved arm 19 is secured at its lower end to the downwardly-extending arm 17, and the upwardly-extending arm 19 at its upper end is curved horizontally outward and thence vertically upward in the direction of the rear, as is best illustrated in Fig. 1. Upon the upper face of the upper arm 19, near its upper curve, a small chain or friction pulley 20 is pivoted, which pulley is in alignment with the larger chain-wheel 18.

An arm 21 is secured to the rear cross-bar of the forward section A of the frame, and the said arm 21 is projected downward and rearward beneath the hinge-frame section A'. To the lower extremity of the arm 21 a chain-wheel 22 is fulcrumed, and the chain-wheels 22 and 18 are in horizontal alignment. The arms 17 and 21 are adjustably connected by a rod or link 23.

An endless chain B is the driving mechanism for the seed drop-slide, and it travels over the chain-wheels 18, 20, and 22. The chain consists of a series of pivotally-connected links of any approved shape, and preferably to every other link 24 of the chain one end of a finger 25 is pivoted. The pivotal connection of the fingers is effected ordinarily at or near the center of the links, and the said fingers consist of a broad paddle-like lower end $a$, the front face whereof is straight and the rear face beveled downwardly, whereby the rear edge is rendered sharp, and an intermediate shank $a'$, connecting the broad lower portion with an upwardly and forwardly curved head $a^2$. The head $a^2$ may be stirrup-shaped, as shown in Fig. 5, in which event the members thereof extend upward at opposite sides of a link and are connected therewith by a pin $a^3$ passed through them and the link; or the head, as shown in Fig. 4, and which is the preferred form, may be of the same size in cross-section as the shank, or practically so, in which event the head is passed upward into the link and is pivoted therein.

In the rear face of each finger, preferably at or near the junction of the shank with the head, a cavity 26 is produced, and each link intermediate of those to which the fingers are pivoted is provided with a forwardly-extending stud 26ª, formed upon its under face, the said studs being adapted to enter the cavities 26 of the fingers the moment the latter enter the ground and to maintain them in a vertical position while they are in action.

At predetermined intervals at one side of the endless chain friction-rollers 27 are pivoted upon suitable pins, which friction-rollers regulate the dropping of the seed and may be arranged close together when the seed is to be so dropped or as far apart as the operator may desire.

The endless-chain driving mechanism, in addition to passing over the chain-wheels, also passes over a friction-pulley 28, which friction-pulley is journaled upon the forward intermediate cross-bar 16 of the hinge-section of the frame. One end of a rod or bar 29 is pivoted to the upper extremity of the upwardly-extending arm 19, and the said bar is extended forward over the hinge-section A' of the frame, its inner end being pivotally united with the rear end of a lever 30 by a suitable connecting-rod 31, the lever 30 at its forward end being fulcrumed at or near the central portion of the forward cross-bar of the front section A.

To the lever 30, near its fulcrum, the upper end of a marker 32 is secured, which marker consists, preferably, of a strip of spring metal curved downward and rearward and terminating at its lower extremity in an essentially-vertical foot 33, which foot is adapted to engage with the ground between the chutes or spouts 11 of the seed-boxes and in horizontal alignment with their lower ends.

Upon the rear cross-bar of the forward section A of the frame an angle-plate or bracket 34 is bolted, and upon the vertical member of the bracket or angle-plate a spur-wheel 35 is pivoted, provided with a series of pins 36 in its forward face. The spur-wheel 35 meshes with a pinion 37, also pivoted upon the bracket, which pinion 37, through the medium of a wrist-pin and pitman 38, is connected with the drop-slide 13. The spur-wheel 35 is partially revolved at each movement of the lever 30, and this is accomplished by means of a bar 39, which bar is attached at its lower end to the lever and extends upward through suitable guideways formed upon the bracket. The edge of the bar 39, adjacent to the pins upon the spur-wheel 35, has produced therein a notch 40 to receive a pin 36 as the bar descends. A gravity-catch 36ª is pivoted to the rear side of the bar 39, adjacent to the notch 40, one corner of which is bent around the bar, as shown, to limit its movement. The toe of the latch projects into the path of the pins 36. Immediately over the friction-roller 28 a weight 41 is adjustably secured to the rod or bar 29, the said weight being so attached as to present a forwardly-inclined lower edge to the friction-rollers.

In operation, as the implement is drawn forward the fingers of the lower links of the endless chain engage with the ground and are held in a vertical position by reason of the spurs of the chain entering the cavities of the fingers. Thus the forward movement of the implement causes the entire endless chain to revolve, and as the links pass upward and over the rear chain-wheel and also downward over the front wheel they drop to a longitudinal engagement with the links, as is best shown in Fig. 3. As the fingers in ascending and descending lie close to the links and also while being carried horizontally upward, they do not in the least retard the movement of the chain. As the chain revolves the friction-pulleys 27, carried by the chain, engage with the under face of the adjustable weight 41 and elevate the same, and as the weight is connected to the rod 29 the said rod is raised, as is also the lever 30, and the upward movement of the lever 30 causes the push-bar 39 to be carried upward also, whereupon the toe of the latch 36ª passes the pin 36, which is above the notch 40, and as the pulley 27 passes the weight 41 the bar 29 drops, carrying with it the lever 30 and the bar 39, when the latch 36ª, engaging the pin 36, which it has just passed, partially revolves the wheel 35, causing the said wheel to impart a lateral movement to the seed drop-slide through the medium of the pinion 37 and pitman 38, and the lateral movement of the drop-slide permits the seed to drop from the seed-boxes to the ground.

Having thus described our invention, we claim as new and desire to secure by Letters Patent—

1. In a planter of the character described, the combination, with a seed drop-bar, of an actuating mechanism connected therewith, consisting of an endless chain, a series of fingers pivoted therein at their upper ends, and stop-spurs projected from the lower faces of the links of the chain, adapted for engagement with one side surface of the said fingers, substantially as shown and described.

2. In a planter, the combination, with the seed drop-bar, of an actuating mechanism consisting of an endless chain, fingers pivoted at their upper ends in the alternate links of the chain, provided with a cavity in one face, and spurs forwardly projected from the under face of the links between the fingers, the said spurs being adapted to enter the cavities in the fingers, as and for the purpose specified.

3. In a planter, the combination, with a seed drop-bar, of an actuating mechanism consisting of an endless chain and fingers pivoted at their upper ends in alternate links of the chain, the said fingers comprising a shovel-like lower end, a shank, and a forwardly-inclined head, which head is pivoted in the links, said fingers being also provided with cavities in one side face, and spurs projected forwardly from the under edges of the links located between the fingers, the said spurs being adapted to enter the cavities of the fingers and to maintain them while in action in a perpendicular position, as and for the purpose specified.

ALBERT J. HELVERN.
WILLIAM B. SCHWALM.

Witnesses:
HENRY SCHWALM,
HARRY SHUMAN.